(12) United States Patent
Yang et al.

(10) Patent No.: US 9,288,028 B2
(45) Date of Patent: Mar. 15, 2016

(54) METHOD AND APPARATUS FOR TRANSMITTING/RECEIVING UPLINK SIGNAL, AND METHOD AND APPARATUS FOR TRANSMITTING/RECEIVING DOWNLINK SIGNAL

(75) Inventors: Suckchel Yang, Anyang-si (KR);
Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 102 days.

(21) Appl. No.: 14/130,249

(22) PCT Filed: Jun. 28, 2012

(86) PCT No.: PCT/KR2012/005133
§ 371 (c)(1),
(2), (4) Date: Dec. 30, 2013

(87) PCT Pub. No.: WO2013/002577
PCT Pub. Date: Jan. 3, 2013

(65) Prior Publication Data
US 2014/0133430 A1    May 15, 2014

Related U.S. Application Data

(60) Provisional application No. 61/501,788, filed on Jun. 28, 2011.

(51) Int. Cl.
*H04L 5/00* (2006.01)
*H04L 1/18* (2006.01)
(Continued)

(52) U.S. Cl.
CPC ............ *H04L 5/0055* (2013.01); *H04L 1/1854* (2013.01); *H04L 1/1864* (2013.01); *H04L 1/1887* (2013.01); *H04W 72/04* (2013.01); *H04W 74/0833* (2013.01)

(58) Field of Classification Search
None
See application file for complete search history.

(56) References Cited

U.S. PATENT DOCUMENTS

2009/0156194 A1    6/2009  Meylan
2009/0191875 A1    7/2009  Vujcic et al.
(Continued)

FOREIGN PATENT DOCUMENTS

KR    10-2009-0109068 A    10/2009

OTHER PUBLICATIONS

Lien et al., "Toward ubiquitous massive accesses in 3GPP machine-to-machine communications," Recent Progress in Machine-to-Machine Communications, IEEE Communications Magazine, Apr. 2011, pp. 66-74.

*Primary Examiner* — Kerri Rose
(74) *Attorney, Agent, or Firm* — Birch, Stewart, Kolasch & Birch, LLP

(57) ABSTRACT

The present invention provides a method for scheduling an uplink and a method for scheduling a downlink for a user equipment group comprising a plurality of user equipments in similar channel situations. In the present invention, which relates to the method for scheduling the uplink, a primary user equipment for a user equipment group is configured, and information according to a random access procedure that is performed by the primary user equipment is shared by means of other user equipments in the user equipment group. In the present invention, which relates to the method for scheduling the downlink, each of the user equipment in the user equipment group attempt to detect downlink data by a random access preamble transmission timing, and transmits a pertinent random access preamble to a base station at the random access preamble transmission timing, thereby notifying the base station of a failure to receive the downlink data, when the detection of the downlink data by the random access preamble transmission timing fails.

20 Claims, 8 Drawing Sheets

(51) Int. Cl.
*H04W 72/04* (2009.01)
*H04W 74/08* (2009.01)

(56) References Cited

U.S. PATENT DOCUMENTS

2009/0259910 A1* 10/2009 Lee et al. ...................... 714/748
2010/0272035 A1    10/2010 Park et al.
2011/0182280 A1*  7/2011 Charbit et al. ................ 370/350
2012/0170479 A1*  7/2012 Ren et al. ...................... 370/252
2012/0170524 A1*  7/2012 Ren et al. ...................... 370/329
2012/0327783 A1* 12/2012 Moon et al. ................... 370/241
2013/0322391 A1* 12/2013 Yang et al. .................... 370/329

* cited by examiner

METHOD AND APPARATUS FOR TRANSMITTING/RECEIVING UPLINK SIGNAL, AND METHOD AND APPARATUS FOR TRANSMITTING/RECEIVING DOWNLINK SIGNAL

CROSS-REFERENCE TO RELATED APPLICATIONS

This application is the National Phase of PCT/KR2012/005133 filed on Jun. 28, 2012, which claims priority under 35 U.S.C. 119(e) to U.S. Provisional Application No. 61/501,788 filed on Jun. 28, 2011, all of which are hereby expressly incorporated by reference into the present application.

TECHNICAL FIELD

The present invention relates to a wireless communication system. More particularly, the present invention relates to a method and apparatus for transmitting/receiving an uplink signal and a method and apparatus for transmitting/receiving a downlink signal in a wireless communication system.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in downlink and SC-FDMA in uplink. LTE-advanced (LTE-A) is an evolved version of 3GPP LTE. WiMAX can be explained by IEEE 802.16e (WirelessMAN-OFDMA reference system) and advanced IEEE 802.16m (WirelessMAN-OFDMA advanced system).

Recently, in a communication technology standardization institute (e.g. 3GPP, IEEE, etc.) for standardizing next generation communication technology (e.g. beyond LTE-A, beyond IEEE 802.16m, etc.), machine type communication (MTC) has emerged as an important standardization issue. MTC refers to information exchange performed between a machine and a base station (BS) without involving persons.

DETAILED DESCRIPTION OF THE INVENTION

Technical Problems

Since a communication service provided through MTC is different from an existing communication service involving persons, a new communication method suitable for MTC needs to be defined.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for transmitting an uplink signal to a base station by a user equipment included in a user equipment group including a plurality of user equipments in a wireless communication system, the method including receiving a random access response to a random access preamble transmitted by a user equipment configured as a primary user equipment among the plurality of user equipments from the base station; transmitting uplink data to the base station based on an uplink grant for the user equipment group, the uplink grant included in the random access response; receiving downlink feedback information for the user equipment group from the base station; and retransmitting the uplink data to the base station if acknowledgement/negative acknowledgement (ACK/NACK) information for the user equipment, included in the downlink feedback information, indicates NACK.

In another aspect of the present invention, provided herein is a user equipment for transmitting an uplink signal to a base station in a wireless communication system, wherein the user equipment is included in a user equipment group including a plurality of user equipments, the user equipment including a radio frequency (RF) unit; and a processor configured to the RF unit, wherein the processor controls the RF unit to receive a random access response to a random access preamble transmitted by a user equipment configured as a primary user equipment among the plurality of user equipments from the base station, controls the RF unit to transmit uplink data to the base station based on an uplink grant for the user equipment group, the uplink grant included in the random access response, controls the RF unit to receive downlink feedback information for the user equipment group from the base station, and controls the RF unit to retransmit the uplink data to the base station if acknowledgement/negative acknowledgement (ACK/NACK) information for the user equipment, included in the downlink feedback information, indicates NACK.

In another aspect of the present invention, provided herein is a method for receiving an uplink signal from a user equipment group including a plurality of user equipments by a base station in a wireless communication system, the method including receiving a random access preamble from a user equipment configured as a primary user equipment among the plurality of user equipments; transmitting a random access response including an uplink grant for the user equipment group to the user equipment group in response to the random access preamble; receiving uplink data from the plurality of user equipments based on the uplink grant for the user equipment group; transmitting downlink feedback information for the user equipment group to the user equipment group; and receiving uplink data retransmitted from a user equipment that has transmitted uplink data determined to be negative acknowledgement (NACK), among the plurality of user equipments in the user equipment group.

In another aspect of the present invention, provided herein is a base station for receiving an uplink signal from a user equipment group including a plurality of user equipments in a wireless communication system, the base station including a radio frequency (RF) unit; and a processor configured to the RF unit, wherein the processor controls the RF unit to receive a random access preamble from a user equipment configured as a primary user equipment among the plurality of user equipments, controls the RF unit to transmit a random access response including an uplink grant for the user equipment group to the user equipment group in response to the random access preamble, controls the RF unit to receive uplink data from the plurality of user equipments based on the uplink grant for the user equipment group, controls the RF unit to transmit downlink feedback information for the user equipment group to the user equipment group, and controls the RF unit to receive uplink data retransmitted from a user equipment that has transmitted uplink data determined to be negative acknowledgement (NACK), among the plurality of user equipments in the user equipment group.

In another aspect of the present invention, provided herein is a method for receiving a downlink signal from a base station by a user equipment included in a user equipment group including a plurality of user equipments in a wireless communication system, the method including detecting a physical downlink control channel (PDCCH) carrying a downlink grant for the user equipment group and receiving a physical downlink shared channel (PDSCH) based on the PDCCH and transmitting a random access preamble allocated to the user equipment to the base station at a random access preamble transmission timing if failing to receive the PDSCH successfully before the random access preamble transmission timing allocated to the user equipment.

In another aspect of the present invention, provided herein is a user equipment for receiving a downlink signal from a base station in a wireless communication system, wherein the user equipment is included in a user equipment group including a plurality of user equipments, the user equipment including a radio frequency (RF) unit; and a processor configured to the RF unit, wherein the processor detects a physical downlink control channel (PDCCH) carrying a downlink grant for the user equipment group, controls the RF unit to receive a physical downlink shared channel (PDSCH) based on the PDCCH, and controls the RF unit to transmit a random access preamble allocated to the user equipment to the base station at a random access preamble transmission timing if failing to successfully receive the PDSCH before the random access preamble transmission timing allocated to the user equipment.

In another aspect of the present invention, provided herein is a method for transmitting a downlink signal to a user equipment group including a plurality of user equipments by a base station in a wireless communication system, the method including transmitting a physical downlink control channel (PDCCH) carrying a downlink grant for the user equipment group to the plurality of user equipments and transmitting a physical downlink shared channel (PDSCH) based on the PDCCH to the plurality of user equipments, and retransmitting the PDSCH to the plurality of user equipments if having received a random access preamble from a user equipment of the user equipment group.

In another aspect of the present invention, provided herein is a base station for transmitting a downlink signal to a user equipment group including a plurality of user equipments in a wireless communication system, the base station including a radio frequency (RF) unit; and a processor configured to the RF unit, wherein the processor controls the RF unit to transmit a physical downlink control channel (PDCCH) carrying a downlink grant for the user equipment group to the plurality of user equipments, controls the RF unit to transmit a physical downlink shared channel (PDSCH) based on the PDCCH to the plurality of user equipments, and controls the RF unit to retransmit the PDSCH to the plurality of user equipments if having received a random access preamble from a user equipment of the user equipment group.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, more effective downlink/uplink control signal transmission for uplink/downlink data scheduling for a UE group consisting of a plurality of UEs can be performed.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
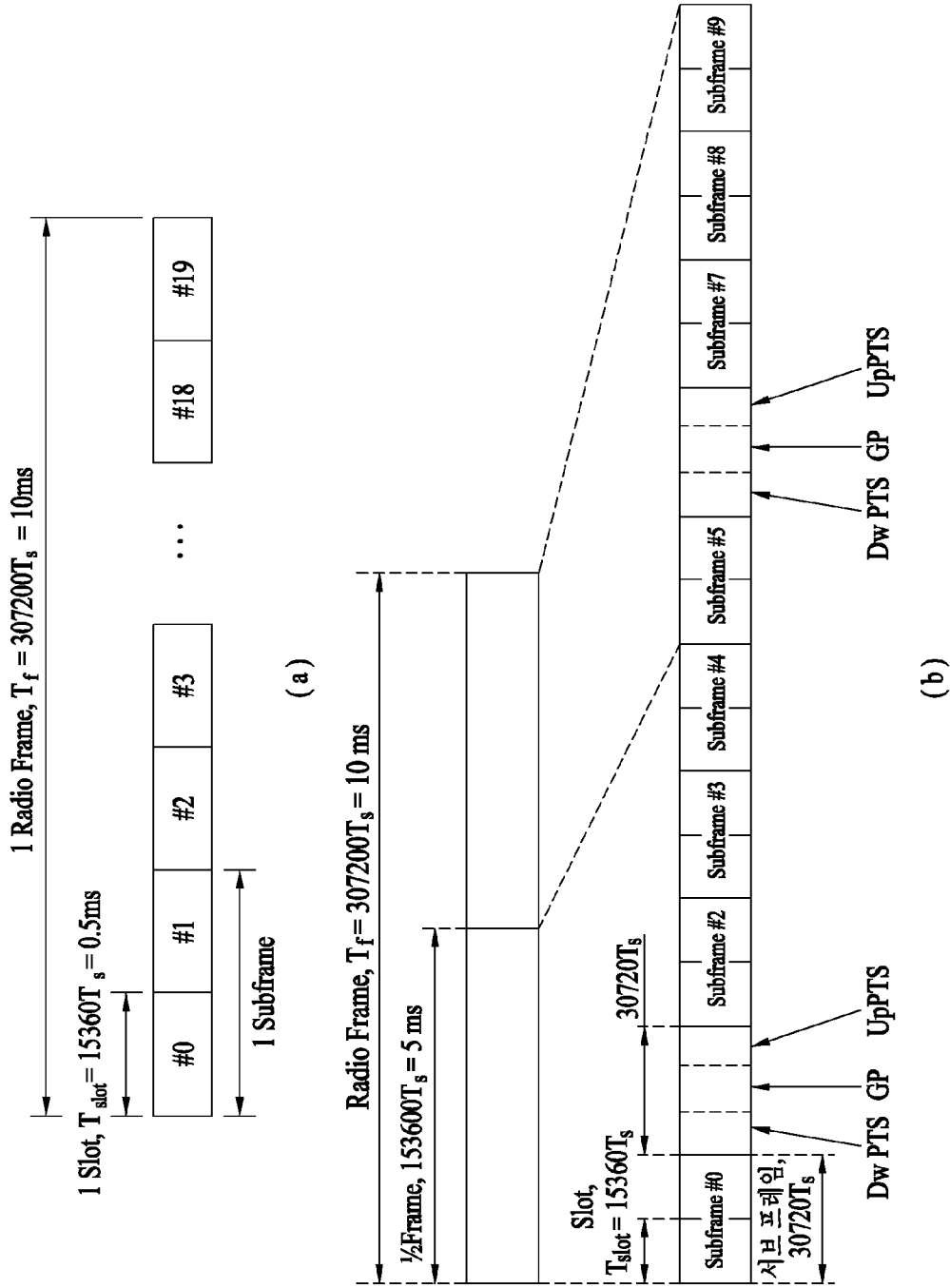
FIG. 1 illustrates the structure of a radio frame used in a wireless communication system.

The following embodiments are combinations of elements and features of the present invention in a predetermined form. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

In the embodiments of the present invention, a description is given of a data transmission and reception relationship between a base station (BS) and a user equipment (UE). Here, the 'base station (BS)' refers to a terminal node of a network communicating directly with the UE. The BS exchanges data and control information by communicating with the UE. In some cases, a specific operation described as being performed by the BS in this specification may be performed by an upper node of the BS. In other words, it is apparent that, in a network comprised of a plurality of network nodes including the BS, various operations performed for communication with the UE may be performed by the BS, or network nodes other than the BS. The term 'base station (BS)' may be replaced with terms such as fixed station, Node B, eNode B (eNB), access point (AP), etc. The 'user equipment (UE)' may be fixed or mobile. Examples of the UE include various devices that transmit and receive user data and/or various kinds of control information to and from a BS. The term 'user equipment (UE)' may be replaced with terms such as terminal, mobile station (MS), mobile subscriber station (MSS), subscriber station (SS), etc.

In the present invention, an 'MTC device' is a type of UE and refers to a user device supporting MTC. The term 'MTC device' may be replaced with terms such as MTC UE, MTC MS, MTC SS, etc. MTC is also referred to as 'machine-to-machine (M2M) communication'. A detailed description of MTC technology will be described after description of FIGS. 1 to 4.

In the present invention, a physical downlink control channel (PDCCH) and a physical downlink shared channel (PDSCH) refer to a set of time-frequency resources or resource elements (REs) carrying downlink control information (DCI) and a set of time-frequency resources or REs carrying downlink data, respectively. In addition, a physical uplink control channel (PUCCH), a physical uplink shared channel (PUSCH), and a physical random access channel (PRACH) refer to a set of time-frequency resources or REs carrying uplink control information (UCI), a set of time-frequency resources or REs carrying uplink data, and a set of time-frequency resources or REs carrying a random access signal, respectively. In the present invention, PUCCH/PUSCH/PRACH transmission of a UE is conceptually identical to UCI/uplink data/random access signal transmission on PUSCH/PUCCH/PRACH, respectively. In addition, PDCCH/PDSCH transmission of a BS is conceptually identical to downlink data/DCI transmission on PDCCH/PDSCH, respectively.

FIG. 1 illustrates the structure of a radio frame used in a wireless communication system. Specifically, FIG. 1(a) illustrates an exemplary structure of a radio frame which can be used in FDD in 3GPP LTE(-A) and FIG. 1(b) illustrates an exemplary structure of a radio frame which can be used in TDD in 3GPP LTE(-A).

Referring to FIG. 1, a 3GPP LTE(-A) radio frame is 10 ms ($307{,}200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15\text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by radio frame number (or radio frame index), subframe number (or subframe index), slot number (or slot index), and the like.

A radio frame may have different configurations according to duplex mode. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a DL subframe, U denotes a UL subframe, and S denotes a special subframe. The special subframe includes three fields, i.e. a downlink pilot time slot (DwPTS), a guard period (GP), and an uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
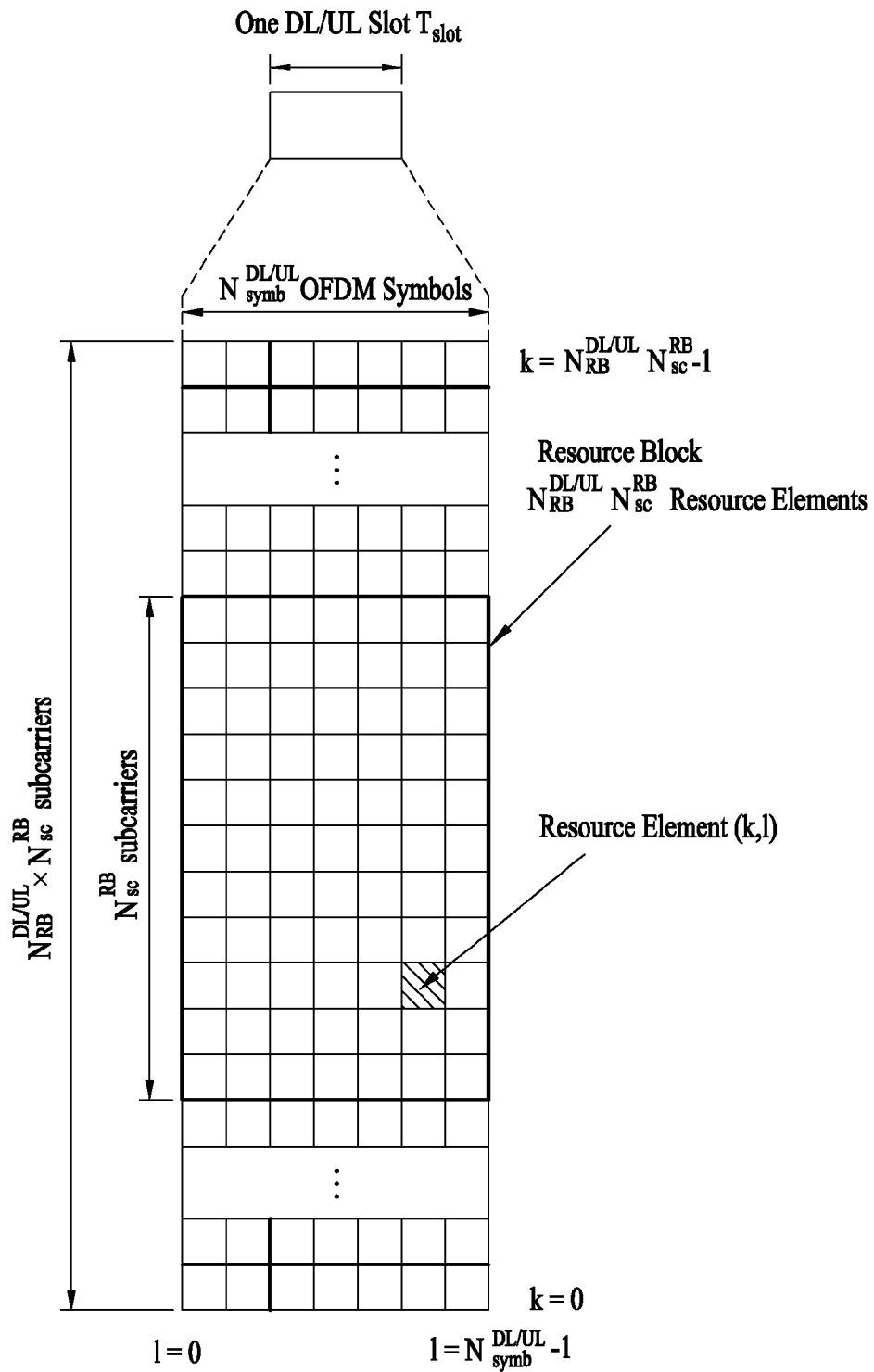
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid is defined per antenna port.

Referring to FIG. 2, a slot includes a plurality of OFDM symbols in the time domain and a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend upon DL transmission bandwidth and UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to a multiple access schemes. The number of OFDM symbols included in one slot may be varied according to channel bandwidth and CP length. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The subcarrier may be categorized as a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

In one subframe, two RBs respectively located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
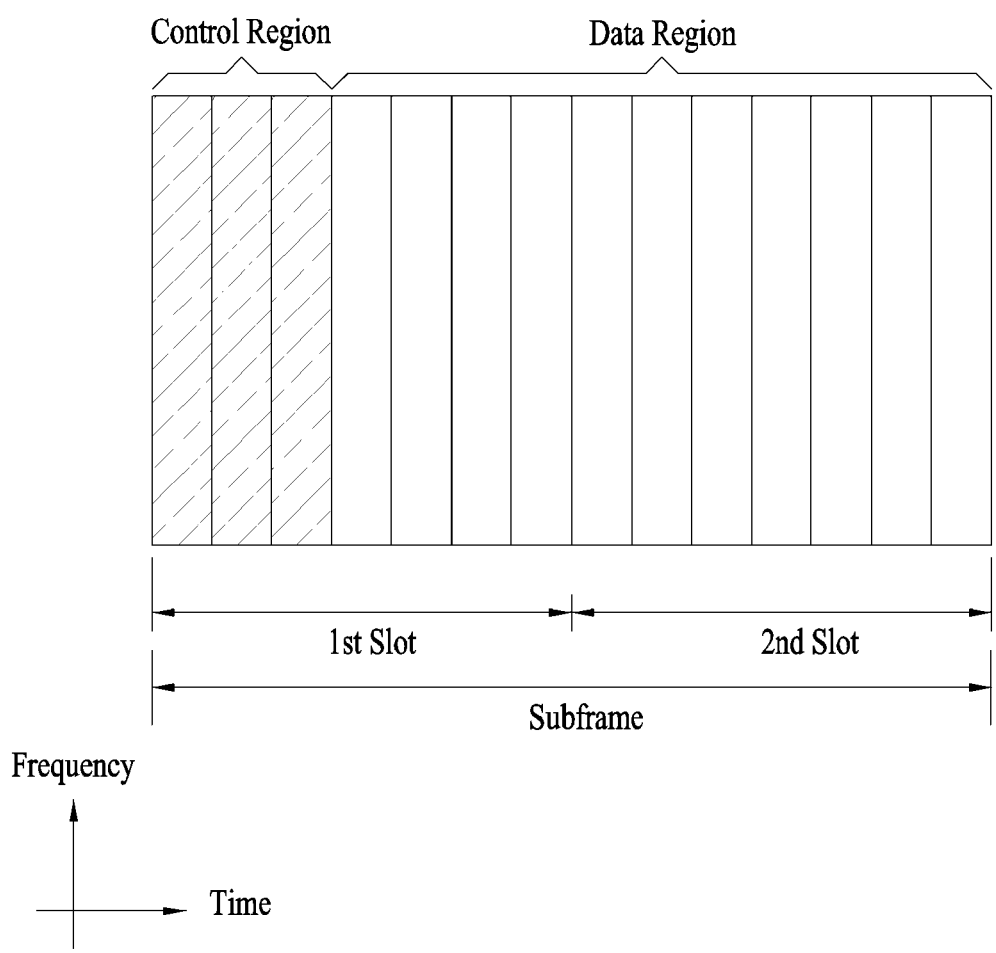
FIG. 3 illustrates the structure of a DL subframe used in a 3GPP LTE(-A) system.

FIG. 3 illustrates the structure of a DL subframe used in a 3GPP LTE(-A) system.

Figure 4:
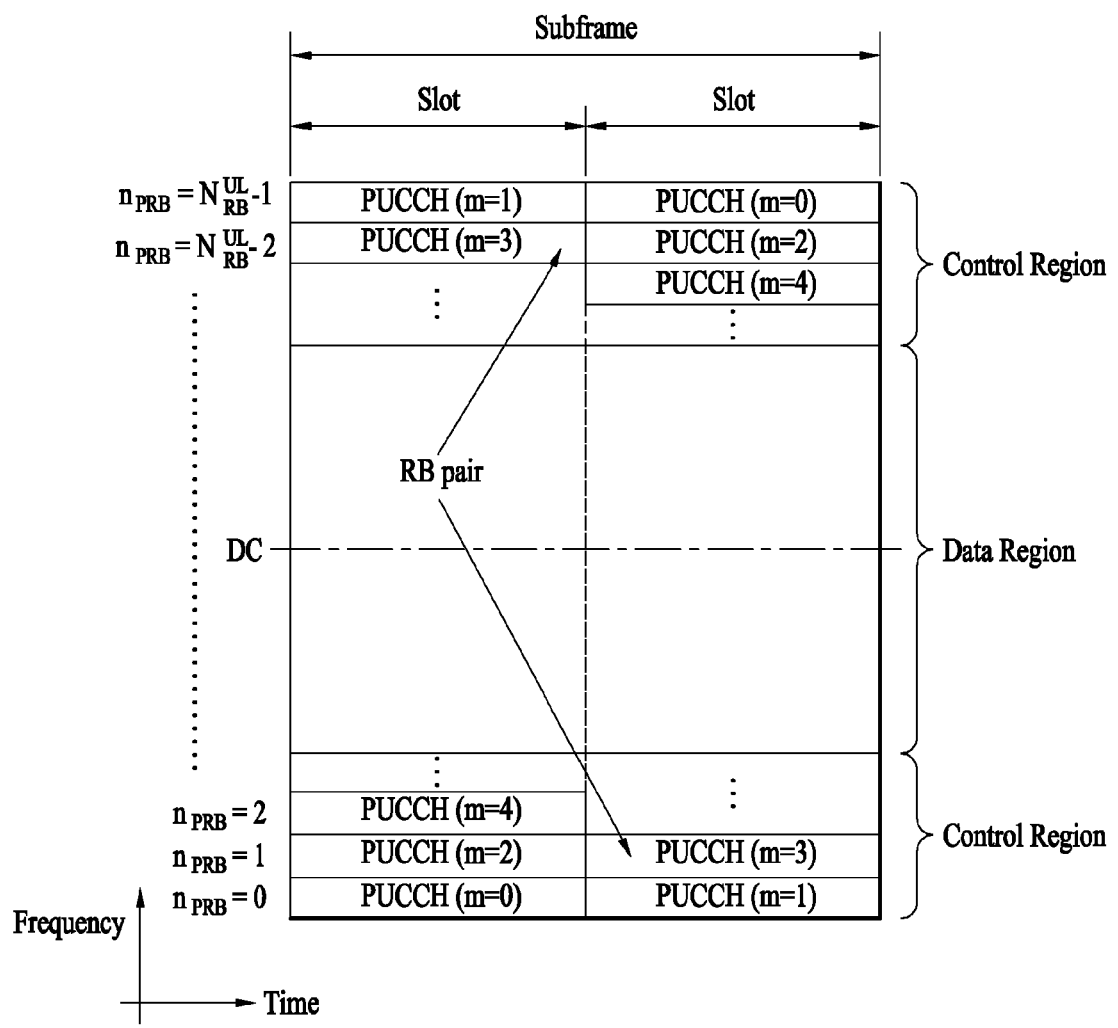
FIG. 4 illustrates the structure of a UL subframe used in a 3GPP LTE(-A) system.

Referring to FIG. 3, a DL subframe is divided into a control region and a data region in the time domain. Referring to FIG. 4, a maximum of 3 (or 4) OFDM symbols located in a front part of a first slot of a subframe correspond to the control region. Hereinafter, a resource region available for PDCCH transmission in the DL subframe is referred to as a PDCCH region. OFDM symbols other than the OFDM symbol(s) used in the control region correspond to the data region to which a PDSCH is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols used for transmission of a control channel within a subframe. The PHICH carries a hybrid automatic repeat request (HARQ) acknowledgement/negative-acknowledgement (ACK/NACK) signal as a response to UL transmission.

Control information transmitted via a PDCCH is referred to as downlink control information (DCI). The DCI includes resource allocation information for a UE or a UE group and other control information. For example, the DCI includes transmission format and resource allocation information of a DL shared channel (DL-SCH) (DL grant hereinafter), transmission format and resource allocation information of a UL shared channel (UL-SCH) (UL grant hereinafter), paging information on a paging channel (PCH), system information on the DL-SCH, resource allocation information of a higher-layer control message such as a random access response transmitted on a PDSCH, a transmit (Tx) power control command set for individual UEs in a UE group, a Tx power control command, activation indication information of voice over IP (VoIP), a downlink assignment index (DAI), etc. A PDCCH is transmitted on an aggregate of one or plural consecutive control channel elements (CCEs). A CCE is a logical assignment unit used to provide a coding rate based on a radio channel state to the PDCCH. The CCE corresponds to a plurality of resource element groups (REGs). For example, one CCE corresponds to 9 REGs and one REG corresponds to 4 REs.

The BS may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of DCI transmitted on one PDCCH may vary according to DCI format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. A UE may monitor the plurality of PDCCHs to detect a PDCCH thereof. Basically, the UE does not know the location at which a PDCCH thereof is transmitted. Therefore, the UE performs blind detection (also referred to as blind decoding) for all PDCCHs of a corresponding DCI format in every subframe until a PDCCH having an identifier thereof is received.

FIG. 4 illustrates the structure of a UL subframe used in a 3GPP LTE(-A) system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted in a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of the PUCCH and the PUSCH may be indicated by higher layers.

In the UL subframe, subcarriers distant from a direct current (DC) subcarrier are used as the control region. In other words, subcarriers located at both ends of a UL transmission bandwidth are used to transmit UL control information such as ACK/NACK for DL data, channel state information for DL (e.g. a channel quality indicator (CQI), a precoding matrix index (PMI), a rank indicator (RI), etc.), and a scheduling request (SR). A DC subcarrier is a component unused for signal transmission and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarrier.

The size and usage of UCI carried by one PUCCH may be changed according to PUCCH format and the size of the UCI may be changed according to coding rate. A UE is assigned PUCCH resources for UCI transmission by a BS through an explicit scheme caused by a higher layer signal or a dynamic control signal, or through an implicit scheme.

In a beyond LTE(-A) system of a 3GPP LTE(-A) system, construction of a low-cost/low-end device based on data communication such as meter reading, water level measurement, use of a surveillance camera, and inventory reporting of a vending machine is considered. Hereinafter, such a device is referred to as an MTC device or an MTC UE. In the case of the MTC UE, since there is less transmission data and a large number of UEs operating per cell, if signal transmission for UL/DL scheduling/feedback is always performed for each UE, BS overhead increases. Particularly, if UL data/feedback caused by the MTC UE is transmitted not persistently but intermittently, a BS cannot persistently maintain UL time/frequency synchronization of the MTC UE. Accordingly, for power saving of the MTC UE, it is desirable that UL data/feedback transmission of the MTC UE be performed by a random access procedure scheme based on a random access preamble.

Meanwhile, for measurement/sensing/report/maintenance, etc., an environment may be considered in which a plurality of MTC UEs performing the same/similar functions are arranged/deployed in a limited space such as a specific building, complex, warehouse, etc. Hereinafter, a plurality of MTC UEs performing the same/similar functions in a limited space is referred to as an MTC group. The MTC group may be configured to intermittently transmit less data. Particularly, in the case of UL synchronization, since MTC UEs are adjacent to each other in a limited space, the UEs belonging to the same MTC group are highly likely to have similar time/frequency synchronization. The present invention proposes a UL/DL scheduling/feedback procedure performed on an MTC group basis, which suits intermittent transmission of less data by a plurality of MTC UEs while reducing signal transmission overhead of the BS. The present invention may be used for communication of various types/purposes between plural normal UEs and the BS as well as communication between plural MTC UEs and the BS.

Prior to a detailed description of embodiments of the present invention, a random access procedure, for UL synchronization acquisition, and discontinuous reception (DRX) and discontinuous transmission schemes, for power saving of a UE, will be described.

First, the random access procedure will be described. In a 3GPP LTE(-A) system based on OFDM and SC-FDM technology, time when a signal transmitted by the UE arrives at the BS differs according to the radius of a cell, location of the UE in the cell, and mobile speed of the UE. That is, if the BS does not manage a transmission timing of each UE, a transmission signal of a specific UE may cause interference with a transmission signal of another UE, thereby increasing an error rate of a reception signal at the side of the BS. In terms of the BS, since data or signals transmitted by all UEs in a cell should be received within a valid time in order to prevent influence of interference, the BS should appropriately adjust a transmission timing of a UE according to a situation of the UE. Such adjustment is called timing advance maintenance or time alignment maintenance. One method for managing UL time alignment is a random access procedure. That is, through the random access procedure, the BS receives a random access preamble transmitted by the UE and calculates a timing synchronization value for advancing or retarding the transmission timing of the UE using information about the received random access preamble. The BS informs the UE of the calculated timing synchronization value through a random access response and the UE updates the transmission timing using the value. If timing advances of the UE and the BS are not matched, the UE does not transmit any UL signal, for example, a PUSCH and a PUCCH, except for the random access preamble.

The random access procedure is described in more detail with reference to FIGS. 5 and 6. In the random access procedure, a random access preamble is used. According to a selection process of the random access preamble by the UE, the random access procedures are classified into a contention based random access procedure in which the UE selects and uses one random access preamble within a specific set and a non-contention based random access procedure in which the UE uses a random access preamble allocated by the BS only to a specific UE. The difference between the two random access procedures is whether there is a contention problem. The non-contention based random access procedure may be used only during a handover procedure or only by request of a BS command.

Figure 5:
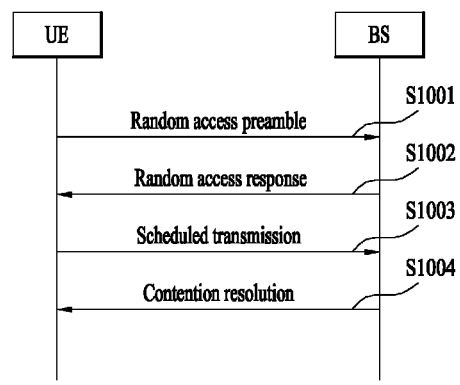
FIG. 5 is a view explaining an operation process of a UE and a BS in a contention based random access procedure.

FIG. 5 is a view explaining an operation process of a UE and a BS in a contention based random access procedure.

1. Random Access Preamble

In the case of contention based random access, the UE may randomly select one random access preamble from a set of random access preambles indicated through system information and a handover command and select and transmit a physical random access channel (PRACH) resource on which the random access preamble can be transmitted (S1001).

2. Random Access Response

After transmitting the random access preamble, the UE attempts to receive a random access response thereof within a random access response reception window indicated by the BS through the system information or handover command (S1002). In more detail, information about the random access response may be transmitted in a format of a media access control (MAC) packet data unit (PDU) and the MAC PDU may be transmitted through a PDSCH. To properly receive information transmitted through the PDSCH, the UE may monitor a PDCCH. The PDCCH may include information about the UE that should receive the PDSCH, frequency and time information of a radio resource of the PDSCH, and a transmission format of the PDSCH. Once the UE succeeds in receiving a PDCCH transmitted thereto, the UE may properly receive a random access response transmitted on the PDSCH according to the information of the PDCCH. The random access response may include a random access preamble identifier (e.g. a RAPID), a UL grant indicating a UL radio resource, a temporary cell radio network temporary ID (C-RNTI) (hereinafter, a temporary cell ID), and a timing advance command (TAC). The reason why the random access preamble ID is needed in the random access response is that one random access response timing may include random access responses for one or more UEs and thus it is necessary to indicate to which UE the UL grant, the temporary cell ID, and the TAC are valid. The UE may receive a UL grant, a temporary cell ID, and a TAC therefor by selecting a random access response having a random access preamble ID equal to the random access preamble selected thereby in step S1001.

3. Scheduled Transmission

If receiving a random access response valid therefor, the UE processes information included in the random access response. That is, the UE applies the TAC and stores the temporary cell ID. In addition, the UE transmits data stored in a buffer thereof or newly generated data to the BS (S1003). In this case, data according to the UL grant should include an ID of the UE. In a contention based random access procedure, the BS cannot judge which UE(s) perform the random access procedure and, for contention resolution later, the BS requires the ID of the UE to identify the UE. There are two methods to include the ID of the UE in data transmitted to the BS in response to the UL grant. In the first method, the UE, that has already been allocated a valid cell ID from a corresponding cell prior to the random access procedure, transmits a cell ID thereof through a UL transmission signal corresponding to the UL grant. On the other hand, the UE, that has not been allocated a valid cell ID prior to the random access procedure, transmits a unique ID (e.g. S-TMSI or a random ID). Generally, the unique ID is longer than the cell ID. The UE, that has transmitted the data corresponding to the UL grant, initiates a timer for contention resolution (hereinafter, a "CR timer").

4. Contention Resolution

For contention resolution, the UE, that has transmitted data including an ID thereof to the BS in response to the UL grant included in the random access response, waits for a command of the BS. That is, the UE attempts to receive a PDCCH to receive a specific message from the BS (S1004). Two methods are used to receive the PDCCH. As mentioned above, if an ID of the UE transmitted in response to the UL grant is a cell ID, the UE may attempt to receive the PDCCH using the cell ID thereof and, if the ID of the UE transmitted in response to the UL grant is a unique ID, the UE may attempt to receive the PDCCH using a temporary cell ID included in the random access response. After this, in the first case, if the UE receives a PDCCH through the cell ID thereof prior to expiration of the CR timer, the UE determines that the random access procedure has been normally completed and ends the random access procedure. In the second case, if the UE receives a PDCCH through the temporary cell ID thereof prior to expiration of the CR timer, the UE confirms data carried through a PDSCH indicated by the PDCCH. If data carried through the PDSCH includes a unique ID of the UE, the UE determines that the random access procedure has been normally completed and ends the random access procedure.

Figure 6:
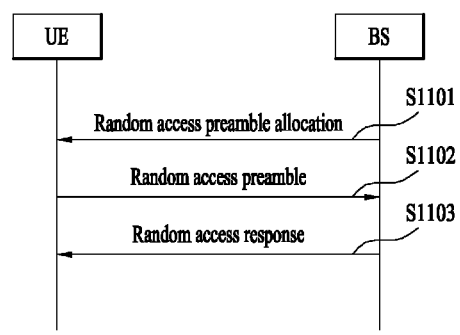
FIG. 6 is a view explaining an operation process of a UE and a BS in a non-contention based random access procedure.

FIG. 6 is a view explaining an operation process of a UE and a BS in a non-contention based random access procedure.

Unlike the contention based random access procedure illustrated in FIG. 5, the UE determines that the random access procedure has normally performed by receiving the random access response and ends the random access procedure.

1. Random Access Preamble Allocation

As described above, the non-contention based random access procedure may be performed during the handover process or by request of a BS command. Obviously, the contention based random access procedure may be performed with respect to the above two cases.

First, for the non-contention random access procedure, the UE receives a dedicated random access preamble having no probability of contention allocated from the BS (S1101). The UE may receive the random access preamble, indicated by the BS, through a handover command or a PDCCH command.

2. Random Access Preamble

The UE transmits the dedicated random access preamble allocated by the BS (S1102).

3. Random Access Response

The UE receives a random access response from the BS (S1103). A method for the UE to receive the random access response from the BS is the same as that in the contention based random access procedure.

Next, DRX and DTX will be described. A UE operating in DRX repeatedly switches reception capabilities thereof on and off. The BS is aware of a DRX operation of the UE. While reception capabilities are on, in other words, during an active (or wakeup) duration of a DRX cycle, the BS performs DL transmission to the UE. An "on" duration of DRX represents a duration during which a receiving device of the UE wakes up and each "on" duration has a length designated by "on duration". An interval from a start time point of a DRX "on" duration to a time point immediately before the next DRX "on" duration is defined to as a DRX cycle or DRX period. That is, the sum of one "on" duration and one "off" duration is a DRX cycle. During the "on" duration of the DRX cycle, the UE may perform at least one of monitoring of a PDCCH thereof, monitoring of a DL L1/L2 control signal, measurement of a neighboring cell of the UE, measurement of a serving cell, reception of a PDSCH, reception of UL timing advance information, reception of a DL reference signal, and reception of ACK/NACK information for UL data. If the DRX "on" duration ends, the receiving device of the UE returns to a sleep (or idle) state according to DRX setting. A UE operating in DTX repeatedly switches transmission capabilities thereof on and off. The BS is aware of a DTX operation of the UE. While transmission capabilities are on, in other words, during an active (or wakeup) duration of a DTX cycle, the BS performs UL transmission from the UE. An "on" duration of DTX represents a duration during which a transmitting device of the UE wakes up and each "on" duration has a length designated by duration during which "on" is maintained. An interval from a start time point of a DTX "on" duration to a time point immediately before the next DTX "on" duration is referred to as a DTX cycle or DTX period. During the "on" duration of the DTX cycle, the UE may perform at least one of transmission of DL channel state information, transmission of UL reference signal for UL demodulation and synchronization detection, transmission of a reference signal for UL channel state measurement, transmission of a UL scheduling request, transmission of a PUSCH, transmission of a random access preamble for UL timing measurement, and transmission of an L1/L2 control signal. If the DTX "on" duration ends, the transmitting device of the UE returns to a sleep (or idle) state according to DTX settings.

■ UL Scheduling Procedure for MTC Group

Figure 7:
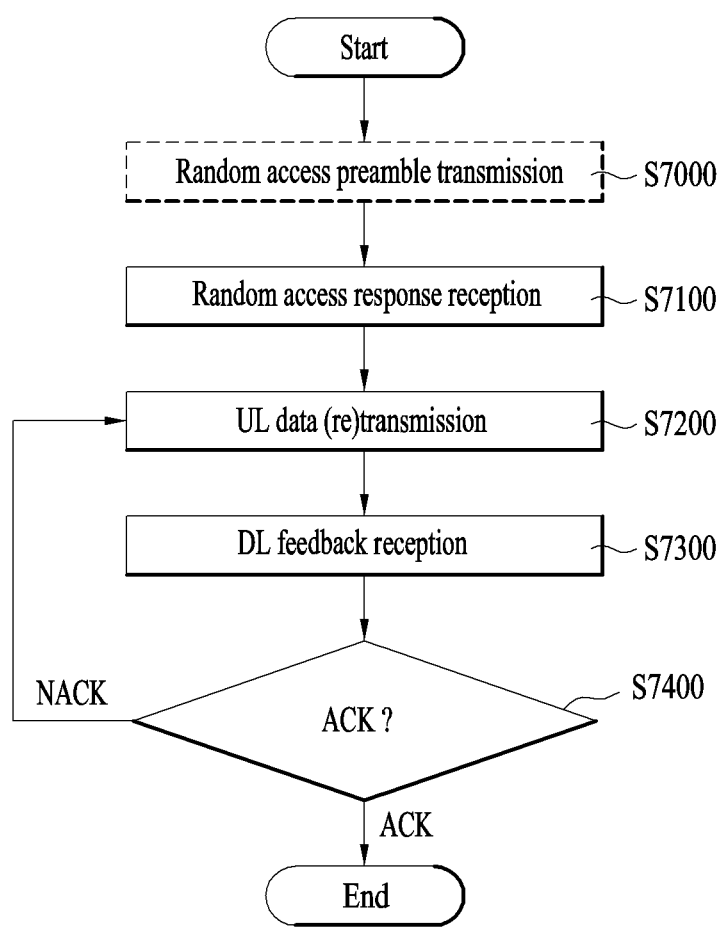
FIG. 7 illustrates an embodiment of the present invention related to a UL scheduling procedure for an MTC group.

FIG. 7 illustrates an embodiment of the present invention related to a UL scheduling procedure for an MTC group.

The present invention configures one MTC group by allocating one ID (e.g. a cell-RNTI (C-RNTI)) to a plurality of (contiguous) MTC UEs having similar UL synchronization (e.g. timing advance (TA)). In this case, one C-RNTI may be commonly allocated to the MTC group and an individual ID may be allocated to each MTC UE, separately from the C-RNTI, for initial access and various configurations. Alternatively, for initial access and various configurations, the C-RNTI may be allocated to each MTC UE as an individual ID and one common group ID may be separately allocated to the MTC group. Hereinafter, an embodiment of the present invention related to a UL scheduling procedure for an MTC group will be described under the assumption of the above first case. In the embodiment of the present invention, one random access preamble (hereinafter, a random access channel (RACH) preamble) and a time/frequency resource for the RACH preamble are allocated to an MTC group. The RACH preamble may be a dedicated RACH preamble. In this case, one ID related to an RACH procedure (e.g. a random access RNTI (RA-RNTI)) may be allocated. Among MTC UEs belonging to an MTC group, a specific MTC UE may be designated as a primary MTC UE (hereinafter, a P-MTC UE). All or some control information about the MTC group and information about a UL transmission timing of the MTC group are shared by all MTC UEs belonging to the MTC group. In the present embodiment, a BS may transmit information indicating an MTC group to which a corresponding MTC UE belongs and information identifying the corresponding MTC UE in the MTC group to each MTC UE. In addition, the BS may further transmit information about an RACH preamble, which a P-MTC UE of an MTC group transmits, and information about a time/frequency resource for the RACH preamble to MTC UEs of the MTC group. The BS may transmit UL transmission timing information of an MTC group to the MTC UEs of the MTC group. In the following embodiment, each MTC UE may identify information transmitted thereto out of information included in a PDCCH and/or a PDSCH, based on the information indicating the MTC group and the identification information allocated thereto which are received from the BS.

Based on the above description, the following UL scheduling procedure on an MTC group basis may be considered.

Step 1) When UL transmission of an MTC group is required (or when a PDCCH order commanding RACH preamble transmission of the MTC group is received from the BS), only one P-MTC UE configured as a P-MTC UE among MTC UEs of the MTC group performs transmission of an RACH preamble allocated to the MTC group (S7000).

Step 2) All MTC UEs in the MTC group detect a PDCCH (characteristically, a PDCCH scrambled with an RA-RNTI) and receive a PDSCH scheduled by the PDCCH (S7100). The PDSCH carries a random access response (hereinafter, an RACH response), which is a response to the RACH preamble transmitted by the P-MTC UE. Hereinafter, the PDSCH carrying the RACH response will be referred to as an RACH response PDSCH. Since the MTC UEs in the MTC group are aware of a time/frequency resource used by the P-MTC UE in an RACH procedure, the MTC UEs can be aware of a time/frequency resource on which the RACH response to the RACH preamble transmitted by the P-MTC UE is to be received. Accordingly, the MTC UEs in the MTC group may monitor the PDCCH in order to receive the RACH response PDSCH on a corresponding time/frequency resource. The RACH response PDSCH may include UL synchronization (e.g. TA) information commonly applied to the MTC group, and/or a UL grant allocated to each MTC UE and time/frequency/code resource information related to the UL grant (i.e. UL resource allocation information). The UL resource allocation information may be pre-allocated and, in this case, the RACH response PDSCH may not include the UL resource allocation information.

Step 3) Each MTC UE in the MTC group performs UL data transmission according to the UL grant and resource allocation information allocated thereto (S7200). Each MTC UE in the MTC group may transmit UL data thereof to the BS by applying common UL synchronization information of the MTC group received from the BS.

Step 4) All MTC UEs in the MTC group may receive the PDSCH scheduled by the PDCCH (characteristically, the PDCCH scrambled with a C-RNTI or RA-RNTI) (S7300).

The PDSCH may carry DL feedback information for UL transmission performed by MTC UEs in the MTC group. Hereinafter, the PDSCH carrying the DL feedback information is referred to as a DL feedback PDSCH. The DL feedback PDSCH may include individual ACK/NACK information for UL data transmission of each MTC UE, and/or a UL grant allocated to an MTC UE requiring retransmission (i.e. receiving NACK) (hereinafter, an N-MTC UE) and time/frequency/code resource information related to the UL grant. Alternatively, a specific PDCCH without a PDSCH may carry only individual ACK/NACK information for UL data transmission of each MTC UE. The BS may scramble the specific PDCCH with a C-RNTI or RA-RNTI or with an RNTI separately from the C-RNTI or RA-RNTI and then transmit the PDCCH to the MTC group.

Step 5) An N-MTC UE, which has received NACK with respect to UL data transmission thereof (S7400), retransmits UL data according to a retransmission UL grant and resource allocation information allocated thereto (S7200). An MTC-UE, which has received ACK with respect to UL data transmission thereof (S7400), i.e. an MTC-UE that does not require retransmission (hereinafter, an A-MTC UE), may not perform operations related to UL data transmission, e.g. detection of a PDCCH carrying a UL grant.

Step 6) An MTC UE including an N-MTC UE, other than an A-MTC UE, repeatedly performs Step 4 and Step 5 until ACK is received.

Referring to FIG. 7, the P-MTC UE performs steps S7000 to S7400 and a normal MTC UE other than the P-MTC UE performs steps S7100 to S7400. Since the normal MTC UE is aware of a timing at which the P-MTC UE transmits the RACH preamble and the time-frequency resource for RACH preamble transmission, the normal MTC UE may monitor the RACH response, transmitted by the BS to a corresponding MTC group, as a response to the RACH preamble transmitted by the P-MTC UE.

■ DL Scheduling Procedure for MTC Group

Figure 8:
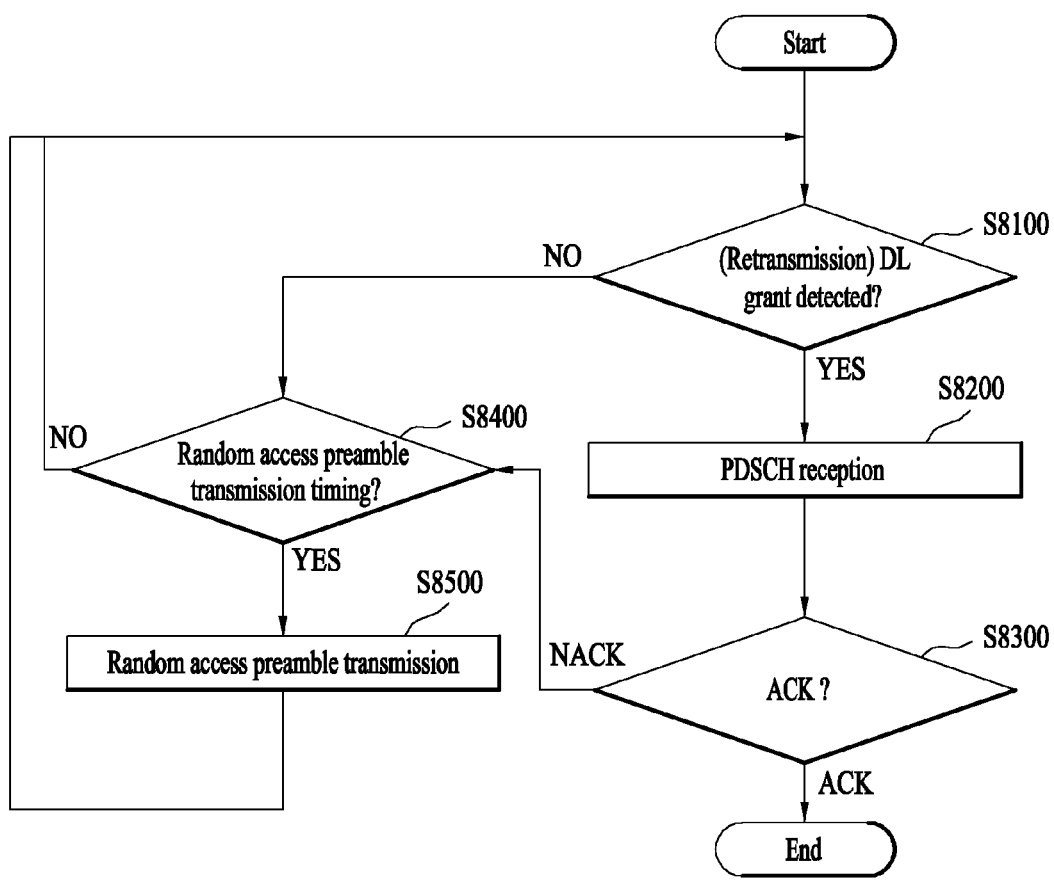
FIG. 8 illustrates an embodiment of the present invention related to a DL scheduling procedure for an MTC group.

FIG. 8 illustrates an embodiment of the present invention related to a DL scheduling procedure for an MTC group.

In the present invention, a plurality of (contiguous) MTC UEs in almost similar channel environments is configured as one MTC group having one ID (e.g. C-RNTI). In this case, one C-RNTI may be commonly allocated to the MTC group and an individual ID may be allocated to each MTC UE, separately from the C-RNTI, for initial access and various configurations. Alternatively, for initial access and various configurations, the C-RNTI may be allocated to each MTC UE as an individual ID and one common group ID may be separately allocated to the MTC group. Hereinafter, an embodiment of the present invention related to a DL scheduling procedure for an MTC group will be described under the assumption of the above first case. In the embodiment of the present invention, an RACH preamble and a time/frequency resource for the RACH preamble are allocated per MTC UE belonging to the MTC group. The RACH preamble may be a contention based preamble or dedicated RACH preamble. In this case, one ID related to an RACH procedure (e.g. a random access RNTI (RA-RNTI)) may be allocated. One equal DRX cycle may be commonly configured/applied to the MTC group. All or a part of information related to a corresponding MTC group, such as an ID of the MTC group, an ID per MTC UE, an RACH preamble per MTC UE, an RA-RNTI and a DRX cycle, may be shared by all MTC UEs belonging to the MTC group. In the present embodiment, a BS may transmit information indicating an MTC group to which a corresponding MTC UE belongs and information identifying the corresponding MTC UE in the MTC group to each MTC UE. In the following embodiment, each MTC UE may identify information transmitted thereto out of information included in a PDCCH and/or a PDSCH, based on the information indicating the MTC group and the identification information allocated thereto which are received from the BS.

Based on the above description, the following DL scheduling procedure on an MTC group basis may be considered.

Step 1) During a wakeup duration of a DRX cycle, all MTC UEs in an MTC group detect a PDCCH (characteristically, a PDCCH scrambled with a C-RNTI) through blind decoding (S8100). The PDCCH carries a (retransmission) DL grant for scheduling a PDSCH. Among the MTC UEs in the MTC group, MTC UE(s) detecting the PDCCH receives the PDSCH transmitted by a BS according to the DL grant (S8200). The PDSCH may carry common information related to the MTC group. Although the case in which the MTC UEs of the MTC group attempt to detect the PDCCH in the wakeup duration of the DRX cycle is exemplified, it is possible that a DRX is not configured and the MTC UEs attempt to detect the PDCCH (i.e. perform blind detection) in every DL subframe or in DL subframes of a predetermined period. Alternatively, it is possible for the MTC UEs to attempt to detect the PDCCH only when the BS pages the MTC group.

Step 2) Upon successful PDCCH detection, an MTC UE decodes the PDSCH based on the PDCCH to determine whether the PDSCH has successfully received (S8300). Among the MTC UEs receiving the PDSCH, an MTC UE, which has determined reception of the PDSCH to be NACK, (hereinafter, an N-MTC UE), attempts to detect the PDCCH carrying a retransmission DL grant (hereinafter, a retransmission DL grant PDCCH) for the PDSCH (S8100) if a transmission timing is before an RACH preamble transmission timing thereof (S8400). The retransmission DL grant PDCCH may be scrambled with a C-RNTI or RA-RNTI and then transmitted to the MTC group from the BS. The N-MTC UE may detect the retransmission DL grant PDCCH using the C-RNTI or RA-RNTI. An MTC UE, which has determined reception of the PDSCH to be ACK (hereinafter, an A-MTC UE), may not perform operations related to DL data reception (e.g. DL grant PDCCH detection, etc.).

The BS may allocate an RACH preamble transmission timing per MTC UE of the MTC group. Alternatively, if the BS informs the MTC group of RACH preamble transmission timing candidates, the MTC UE may randomly select an RACH preamble transmission timing and may transmit an RACH preamble thereof to the BS at the selected transmission timing.

Step 3) If the N-MTC UE fails to detect the retransmission DL grant PDCCH before an RACH transmission timing thereof (S8400 and S8100), the N-MTC UE transmits a contention or non-contention based RACH preamble allocated thereto, instead of NACK, to the BS at the RACH transmission timing (S8400 and S8500). If the N-MTC UE fails to successfully receive a retransmitted PDSCH before the RACH transmission timing even though the retransmission DL grant PDCCH has successfully detected, the N-MTC UE transmits the RACH preamble allocated thereto to the BS at the RACH transmission timing (S8300, S8400, and S8500). In this embodiment, since the RACH preamble is allocated on an MTC UE basis, the BS can recognize that a corresponding MTC UE has fed back NACK for DL data by receiving the RACH preamble. If the N-MTC UE successfully detects the retransmission DL grant PDCCH before the RACH preamble transmission timing thereof (S8400 and S8100), the N-MTC UE receives a (retransmitted) PDSCH corresponding to the retransmission DL grant PDCCH and determines ACK/NACK for the PDSCH (S8200 and S8300).

Step 4) An MTC UE other than an A-MTC UE repeatedly performs Step 2 and Step 3 until ACK for the received (retransmission) PDSCH is determined.

According to this embodiment, each MTC UE in the MTC group does not immediately transmit NACK to the BS even if reception of the PDSCH fails. That is, even if the MTC UE in the MTC group fails to receive the PDSCH, the MTC UE does not transmit ACK/NACK information to the BS before time allocated thereto for the RACH procedure (i.e. an RACH preamble transmission timing). Instead, the MTC UE in the MTC group attempts to detect the (retransmission) DL grant PDCCH before the RACH preamble transmission timing allocated thereto. If one of MTC UEs in a corresponding MTC group transmits the RACH preamble to the BS before the RACH preamble transmission timing of a corresponding MTC UE, the BS will transmit the (retransmission) DL grant PDCCH to the MTC group in order to retransmit the PDSCH to the MTC group. Accordingly, the N-MTC UE has a high probability of receiving the DL grant PDCCH transmitted by the BS to the MTC group as a response to an RACH preamble transmitted by another N-MTC UE in the MTC group, before the RACH preamble transmission timing thereof, even if the RACH preamble thereof is not transmitted to the BS. According to this embodiment, since all MTC UEs in the MTC group need not individually feed back ACK/NACK information for DL data transmitted by the BS, there is an advantage of reducing overhead for UL control signal transmission. In addition, since the BS need not process UL ACK/NACK information per MTC UE, processing load at the side of the BS for MTC UL control information may not greatly increase even if MTC UEs greatly increases in number.

The embodiment of FIG. 7 and the embodiment of FIG. 8 may be independently implemented.

Figure 9:
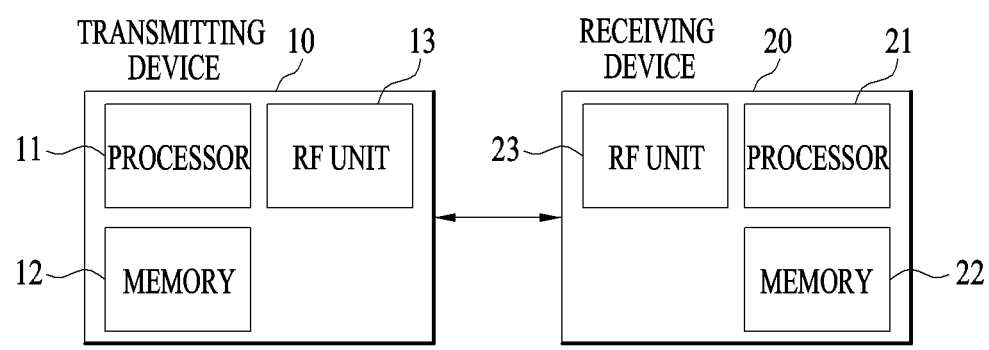
FIG. 9 is a block diagram illustrating elements of a transmitting device 10 and a receiving device 20 for implementing the present invention.

FIG. 9 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23, according to an embodiment of the present invention, under control of the processors 11 and 21. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna viewed from the view point of the receiving device 20 and enables the receiving device 20 to perform channel estimation for the antenna, irrespective of whether it represents a single radio channel from one physical antenna or a composite channel from a plurality of physical antenna elements including the antenna. That is, an antenna is defined such that a channel carrying a symbol of the antenna can be derived from a channel carrying another symbol of the same antenna. An RF unit supporting a MIMO function of transmitting and receiving data using a plurality of antennas may be connected to two or more antennas.

In the embodiments of the present invention, an MTC UE operates as the transmitting device 10 in UL and as the receiving device 20 in DL. In the embodiments of the present invention, a BS operates as the receiving device 20 in UL and as the transmitting device 10 in DL. In the embodiments of the present invention, the processor, RF unit, and memory included in the MTC UE are referred to as a UE processor, a UE RF unit, and a UE memory, respectively, and the processor, RF unit, and memory unit included in the BS are referred to as a BS processor, a BS RF unit, and a BS memory, respectively.

In the present invention, the BS processor may control the BS RF unit to transmit information about MTC group configuration (e.g. an ID of the MTC group ID and an ID of each MTC UE in the MTC group) to each MTC UE. The UE processor may apply the MTC group configuration to system configuration thereof, based on the information about the MTC group configuration and an MTC UE ID thereof in a corresponding MTC group. According to the embodiments of the present invention, the BS processor controls the BS RF unit to transmit a PDCCH and/or a PDSCH and the UE processor controls the UE RF unit to receive the PDCCH and/or the PDSCH. According to the embodiments of the present invention, the UE processor controls the UE RF unit to transmit an RACH preamble and ACK/NACK information for DL transmission to the BS and controls the RF unit to receive an RACH response and ACK/NACK information for UL transmission. The BS processor controls the BS RF unit to transmit the RACH preamble and the ACK/NACK information for the DL transmission to a corresponding MTC group and controls the BS RF unit to transmit the RACH response and the ACK/NACK information about UL transmission to a corresponding MTC group.

More specifically, referring to FIG. 7, the UE processor controls the UE RF unit to receive an RACH response to an RACH preamble transmitted by a P-MTC UE among MTC UEs in an MTC group. The RACH response may be received on a PDSCH and may include TA information commonly applied to the MTC group, a UL grant allocated to each MTC UE, and resource allocation information related to the UL grant. The UE processor may control the UE RF unit to transmit UL data to the BS based on the UL grant included in the RACH response. The UE processor may control the UE RF unit to receive DL feedback information transmitted by the BS in response to the UL data. The DL feedback information may be included in a PDSCH or a PDCCH and may be transmitted from the BS to the UE. The DL feedback information may include ACK/NACK information for each of MTC UEs transmitting UL data among MTC UEs in the MTC group. If the ACK/NACK information for the MTC UE included in the DL feedback information is NACK, the UE processor may control the UE RF unit to retransmit UL data to the BS. If the BS RF unit receives the RACH preamble from the P-MTC UE of the MTC group, the BS processor may control the BS RF unit to transmit the RACH response to the MTC group as a response to the RACH preamble. The BS processor may control the BS RF unit to transmit a PDCCH for the MTC group and a PDSCH according to the PDCCH as the RACH response. The BS processor may receive the UL data transmitted by MTC UEs in the MTC group based on the RACH response and determine ACK/NACK per MTC UE transmitting the UL data. The BS processor may generate DL feedback information including ACK/NACK information per MTC UE transmitting the UL data and control the BS RF unit to transmit the DL feedback information to the MTC group. The DL feedback information may be transmitted to the MTC group on the PDSCH. The BS processor may control the BS RF unit to re-receive the UL data determined to be NACK from the MTC UE.

Referring to FIG. 8, the UE processor may detect a PDCCH carrying a DL grant for an MTC group and control the UE RF unit to receive a PDSCH based on the PDCCH from the BS. The UE processor may perform blind detection of the PDCCH during an "on" duration of a DRX cycle. Alternatively, the UE processor may perform blind detection of the PDCCH in a predetermined DL subframe. Alternatively, if the UE RF unit receives a paging message from the BS, the UE processor may perform blind detection of the PDCCH in response to the paging message. If the UE processor fails to receive the PDSCH successfully before an RACH preamble transmission timing allocated to the UE, the UE processor may control the UE RF unit to transmit an RACH preamble allocated to the UE to the BS at the RACH preamble transmission timing. During the "on" duration of the DRX cycle, or in a predetermined DL subframe, or after the paging message is transmitted to the MTC group, the BS processor may control the BS RF unit to transmit the PDCCH carrying the DL grant to the MTC group. The BS processor may control the BS RF unit to transmit the PDSCH based on the DL grant carried by the PDCCH to the MTC group. If no RACH preamble is received from the MTC group, the BS need not retransmit previously transmitted DL data. However, if the BS RF unit receives an RACH preamble from a MTC UE of the MTC group, the BS processor determines that the previously transmitted DL data should be retransmitted to the MTC group and controls the BS RF unit to retransmit the previous DL data. If a predetermined time has elapsed, the BS processor may determine that all MTC UEs in a corresponding MTC group have successfully received DL data. For example, if no RACH preamble is received from the MTC group before RACH preamble transmission timings of all MTC UEs of the MTC group elapse, the BS processor may determine that the all MTC UEs of the MTC group have successfully received the DL data.

According to the above-described embodiments of the present invention, during UL/DL data scheduling on an MTC group basis, a UL/DL control signal can be efficiently transmitted/received.

The detailed description of the preferred embodiments of the present invention has been given hereinabove to enable those skilled in the art to implement and practice the invention. Although the invention has been described with reference to exemplary embodiments, those skilled in the art will appreciate that various modifications and variations can be made in the present invention without departing from the spirit and scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for transmitting, by a user equipment, an uplink signal in a wireless communication system, the method comprising:
receiving, by the user equipment from a base station, machine type communication (MTC) group configuration information for a group of user equipments (MTC group);
receiving, by the user equipment from the base station, a random access response physical downlink control channel (RA response PDCCH) corresponding to a random access preamble based on the MTC group configuration information and a random access response physical downlink shared channel (RA response PDSCH) based on the RA response PDCCH, with or without transmitting, by the user equipment, the random access preamble to the base station according to whether the user equipment is a primary user equipment of the MTC group or not;
transmitting, by the user equipment to the base station, uplink data to the base station based on the RA response PDSCH;

receiving, by the user equipment from the base station, a PDSCH carrying downlink feedback information for the MTC group (DL feedback PDSCH); and retransmitting, by the user equipment to the base station, the uplink data when acknowledgement/negative acknowledgement (ACK/NACK) information of the user equipment, included in the DL feedback PDSCH, indicates NACK.

2. The method according to claim 1, wherein:

the RA response PDSCH carries timing advance information for the MTC group, and the uplink data is transmitted or retransmitted to the base station based on the timing advance information.

3. The method according to claim 2, wherein the DL feedback PDSCH carries ACK/NACK information per user equipment belonging to the MTC group, and uplink resource allocation information for a user equipment of which ACK/NACK information indicates NACK.

4. The method according to claim 1, wherein the MTC group configuration information includes at least information indicating which user equipment in the MTC group corresponding to the MTC group configuration information is the primary user equipment, a common identifier for the MTC group, a unique identifier per user equipment belonging to the MTC group, a random access radio network temporary identifier for the MTC group, a random access preamble information dedicated to the MTC group, or a random access radio resource information for the MTC group.

5. The method according to claim 1, wherein the RA response PDSCH carries uplink resource allocation information per user equipment belonging to the MTC group.

6. A user equipment for transmitting an uplink signal in a wireless communication system, the user equipment comprising:

a radio frequency (RF) unit; and a processor configured to control the RF unit, wherein the processor is further configured to:

control the RF unit to receive, from a base station, machine type communication (MTC) group configuration information for a group of user equipments (MTC group), control the RF unit to receive, from the base station, a random access response physical downlink control channel (RA response PDCCH) corresponding to a random access preamble based on the MTC group configuration information and a random access response physical downlink shared channel (RA response PDSCH) based on the RA response PDCCH, with or without transmitting, by the user equipment, the random access preamble to the base station according to whether the user equipment is a primary user equipment of the MTC group or not, control the RF unit to transmit, to the base station, uplink data based on the RA response PDSCH, control the RF unit to receive, from the base station, a PDSCH carrying downlink feedback information for the MTC group (DL feedback PDSCH), and control the RF unit to retransmit, to the base station, the uplink data when acknowledgement/negative acknowledgement (ACK/NACK) information of the user equipment, included in the DL feedback PDSCH, indicates NACK.

7. The user equipment according to claim 6, wherein:

the RA response PDSCH carries timing advance information for the MTC group, and the processor controls the RF unit to transmit or retransmit the uplink data to the base station based on the timing advance information.

8. The user equipment according to claim 7, wherein the DL feedback PDSCH carries ACK/NACK information per user equipment belonging to the MTC group, and uplink resource allocation information for a user equipment of which ACK/NACK information indicates NACK.

9. The user equipment according to claim 6, wherein the MTC group configuration information includes at least information indicating which user equipment in the MTC group corresponding to the MTC group configuration information is the primary user equipment, a common identifier for the MTC group, a unique identifier per user equipment belonging to the MTC group, a random access radio network temporary identifier for the MTC group, a random access preamble information dedicated to the MTC group, or a random access radio resource information for the MTC group.

10. The user equipment according to claim 6, wherein the RA response PDSCH carries uplink resource allocation information per user equipment belonging to the MTC group.

11. A method for receiving, by a base station, an uplink signal in a wireless communication system, the method comprising:

transmitting, by the base station to a group of user equipments (MTC group), machine type communication (MTC) group configuration information;

receiving, by the base station from only a primary user equipment among the user equipments belonging to the MTC group, a random access preamble based on the MTC group configuration information;

transmitting, by the base station to each user equipment belonging to the MTC group, a random access response physical downlink control channel (RA response PDCCH) corresponding to the random access preamble based on the MTC group configuration information and a random access response physical downlink shared channel (RA response PDSCH) based on the RA response PDCCH;

receiving, by the base station from the MTC group, uplink data based on the RA response PDSCH;

for the user equipment group;

transmitting, by the base station to each user equipment belonging to the MTC group, a PDSCH carrying downlink feedback information for the MTC group; and receiving, by the base station, uplink data retransmitted by a user equipment (NACK user equipment), of which acknowledgement/negative acknowledgement (ACK/NACK) indicates NACK, among the user equipments belonging to the MTC group.

12. The method according to claim 11, wherein:

the RA response PDSCH carries timing advance information for the MTC group, and the uplink data transmitted or retransmitted by the NACK user equipment is received or re-received from the NACK user equipment based on the timing advance information.

13. The method according to claim 11, wherein the DL feedback PDSCH carries ACK/NACK information per user equipment belonging to the MTC group, and uplink resource allocation information for the NACK user equipment.

14. The method according to claim 11, wherein the MTC group configuration information includes at least information indicating which user equipment in the MTC group is the primary user equipment, a common identifier for the MTC group, a unique identifier per user equipment belonging to the MTC group, a random access radio network temporary identifier for the MTC group, a random access preamble information dedicated to the MTC group, or a random access radio resource information for the MTC group.

15. The method according to claim 11, wherein the RA response PDSCH carries uplink resource allocation information per user equipment belonging to the MTC group.

16. A base station for receiving an uplink signal in a wireless communication system, the base station comprising:
a radio frequency (RF) unit; and
a processor configured to control the RF unit,
wherein the processor is further configured to:
control the RF unit to transmit, to a group of user equipments (MTC group), machine type communication (MTC) group configuration information,
control the RF unit to receive, from only a primary user equipment among the user equipments belonging to the MTC group, a random access preamble based on the MTC group configuration information,
control the RF unit to transmit, to each user equipment belonging to the MTC group, a random access response physical downlink control channel (RA response PDCCH) corresponding to the random access preamble based on the MTC group configuration information and a random access response physical downlink shared channel (RA response PDSCH) based on the RA response PDCCH,
control the RF unit to receive, from the MTC group, uplink data based on the RA response PDSCH),
control the RF unit to transmit, to each user equipment belonging to the MTC group, a PDSCH carrying downlink feedback information for the MTC group, and
control the RF unit to receive uplink data retransmitted by a user equipment (NACK user equipment), of which acknowledgement/negative acknowledgement (ACK/NACK) indicates NACK, among the user equipments belonging to the MTC group.

17. The base station according to claim 16, wherein:
the RA response PDSCH carries timing advance information for the MTC group, and
the uplink data transmitted or retransmitted by the NACK user equipment is received or re-received from the NACK user equipment based on the timing advance information.

18. The base station according to claim 16, wherein the DL feedback PDSCH carries ACK/NACK information per user equipment belonging to the MTC group, and uplink resource allocation information for the NACK user equipment.

19. The base station according to claim 16, wherein the MTC group configuration information includes at least information indicating which user equipment in the MTC group is the primary user equipment, a common identifier for the MTC group, a unique identifier per user equipment belonging to the MTC group, a random access radio network temporary identifier for the MTC group, a random access preamble information dedicated to the MTC group, or a random access radio resource information for the MTC group.

20. The base station according to claim 16, wherein the RA response PDSCH carries uplink resource allocation information per user equipment belonging to the MTC group.

* * * * *